No. 650,946. Patented June 5, 1900.
H. P. MASON & T. HART.
APPARATUS FOR HAULING LOGS.
(Application filed Dec. 6, 1899.)
(No Model.) 2 Sheets—Sheet 1.

No. 650,946. Patented June 5, 1900.
H. P. MASON & T. HART.
APPARATUS FOR HAULING LOGS.
(Application filed Dec. 6, 1899.)

(No Model.) 2 Sheets—Sheet 2.

UNITED STATES PATENT OFFICE.

HARRY P. MASON AND THOMAS HART, OF MILLWOOD, CALIFORNIA.

APPARATUS FOR HAULING LOGS.

SPECIFICATION forming part of Letters Patent No. 650,946, dated June 5, 1900.

Application filed December 6, 1899. Serial No. 739,371. (No model.)

*To all whom it may concern:*

Be it known that we, HARRY P. MASON and THOMAS HART, citizens of the United States, residing at Millwood, in the county of Fresno and State of California, have invented a new and useful Apparatus for Hauling Logs, of which the following is a specification.

The invention relates to improvements in apparatus for hauling logs.

The object of the present invention is to improve the means employed for hauling logs from woods to a mill over a chute or skid-road and to provide a simple and comparatively-inexpensive apparatus of this character of great strength and durability and of maximum capacity adapted to dispense with gear-wheels and capable of enabling belts to be employed at all points for communicating motion, whereby it is adapted to be run at a high rate of speed and at the same time maintain a steady strain on the main cable, thereby increasing the durability of the same and lessening the cost of handling logs in this manner.

The invention consists in the construction and novel combination and arrangement of parts hereinafter fully described, illustrated in the accompanying drawings, and pointed out in the claims hereto appended.

Figure 1:
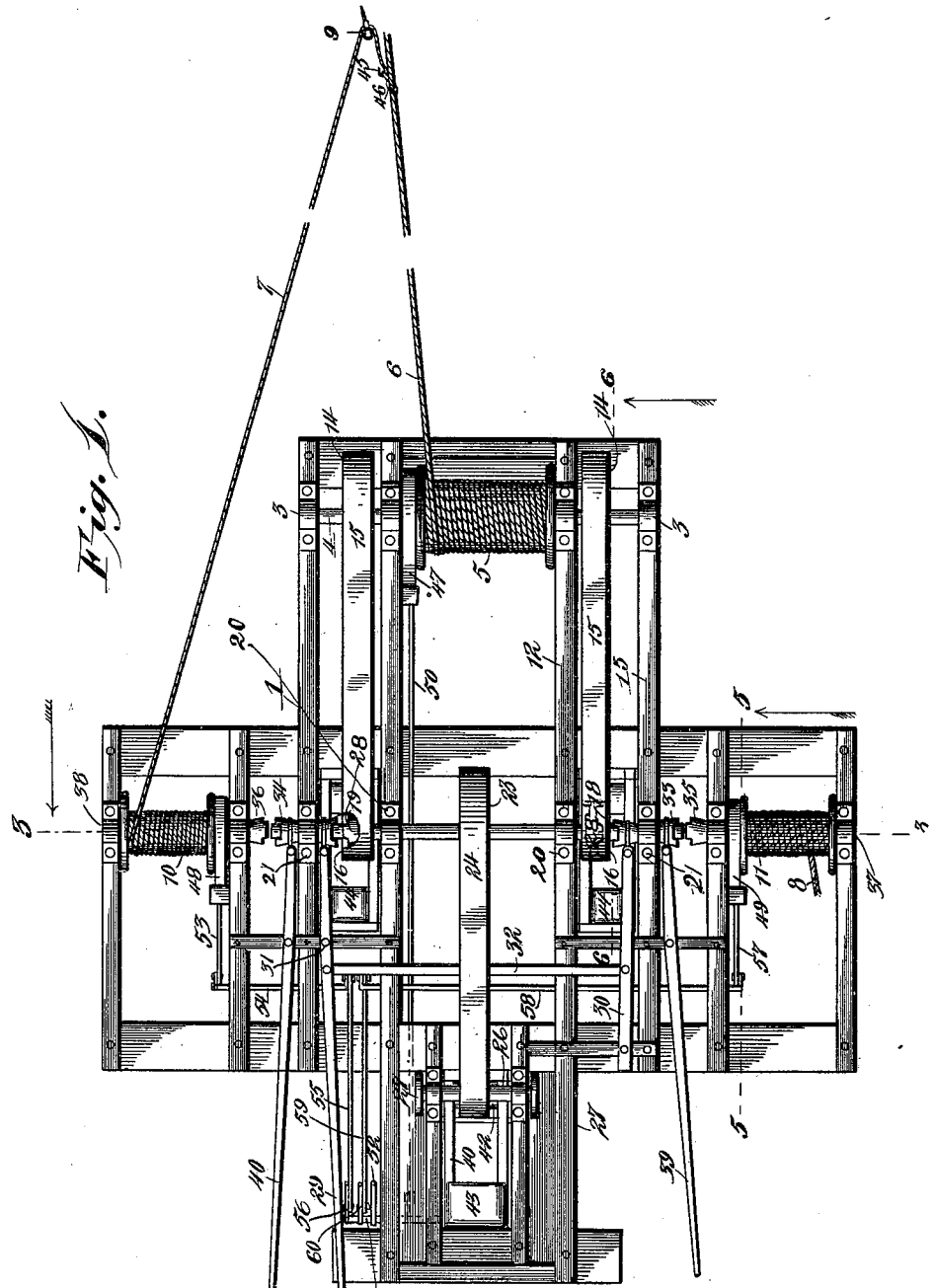
Figure 2:
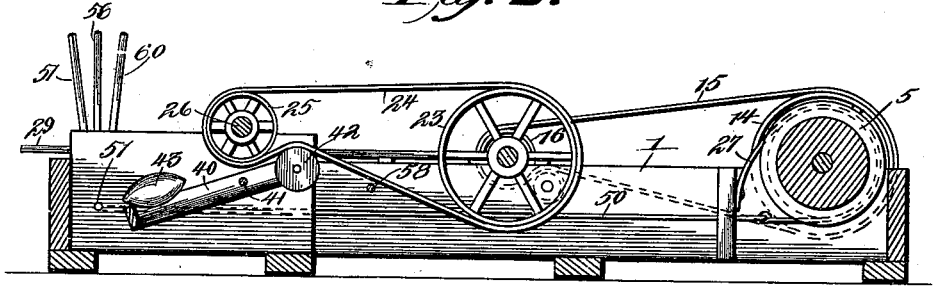
Figure 4:
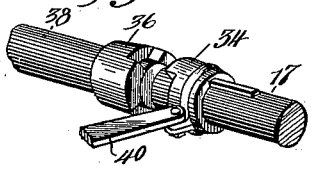
Figure 5:
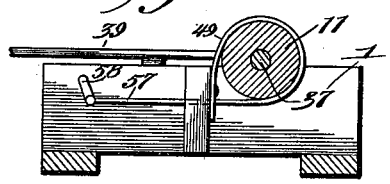
Figure 3:
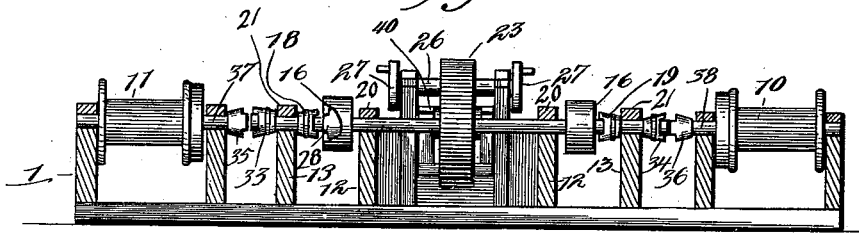

In the drawings, Figure 1 is a plan view of an apparatus constructed in accordance with this invention. Fig. 2 is a longitudinal sectional view. Fig. 3 is a transverse sectional view on the line 3 3 of Fig. 1. Fig. 4 is a detail perspective view of one of the clutches. Fig. 5 is a detail sectional view on the line 5 5 of Fig. 1.

Like numerals of reference designate corresponding parts in all the figures of the drawings.

1 designates a supporting-frame composed of approximately rectangular longitudinal and transverse portions and provided at its front end with bearings 2 and 3 for the reception of a transverse shaft 4, on which is fixed a main drum 5, having a main cable 6 wrapped around it, and this cable, which is designed to be run out by the means hereinafter described, is adapted to have a series of logs coupled to it, whereby they are drawn along a log-chute or skid-road and conveyed from woods to a mill. The main cable 6 is designed to be connected with either one of a pair of supplemental cables 7 and 8 to form a reciprocatory carrier, which passes around a large sheave or pulley 9, designed to be anchored or secured at a suitable point from which the logs are to be hauled. The supplemental cables 7 and 8, which are designed to be lighter or of less diameter than the main cable, as they are only subjected to the strain of running the latter out to the logs, are wound or wrapped around side drums 10 and 11, located at opposite sides of the frame, as clearly illustrated in Fig. 1 of the accompanying drawings. The side drums are thrown out of operation by the means hereinafter described, when power is applied to the central or main drum in order that the supplemental cable may unwind freely while the logs are being hauled to the mill, and the central or main drum is allowed to run free when either of the side drums is operated to wind up the supplemental cable and run the main cable out for another load.

The central longitudinal portion of the supporting-frame is provided with longitudinal beams or sills 12 and 13, arranged in pairs and spaced apart to receive pulleys 14 and belts 15, extending from the front pulleys 14 to a pair of rear pulleys 16, mounted on a central transverse shaft 17, carrying suitable clutches 18 and 19, whereby the pulleys 14 and 16 and the main drum may be thrown into and out of operation. The central transverse clutch-shaft 17 is journaled in suitable bearings 20 and 21 of the longitudinal sills or beams, and it has fixed to it a central pulley 23, which is connected by a belt 24 with a drive-pulley 25 of an engine-shaft 26, carrying crank-disks 27 at its ends and connected by suitable pitmen with cylinders (not shown) of an engine. Motion is transmitted from the drive-pulley 25 through the belt 24 to the clutch-shaft, and the side belts 15 transmit the motion of the clutch-shaft to the front shaft 4, which carries the main drum.

The rear side pulleys 16 are loose upon the clutch-shaft, and they carry clutch members or portions 28, which are adapted to be engaged by the sliding clutches 18 and 19, mounted on the shaft 17 at points between the longitudinal sills 12 and 13 and adapted to be operated simultaneously by the means hereinafter described. The clutches 18 and 19 are secured to the shaft by means of suitable feathers or keys, and they are connected, respectively, to longitudinal levers 29 and 30 by means of suitable collars arranged in grooves of the clutches and pivoted to the adjacent ends of the levers. The lever 29, which is adapted to be operated by hand, is fulcrumed near its front end, at 31, on a transverse bar, and it is connected at a point in rear of the fulcrum by a rod 32 with the other lever 30, which is fulcrumed at its rear end. When the operating-lever 29 is oscillated, the sliding clutches 18 and 19 are simultaneously moved to and from the rear side pulleys 16 to engage them with and disengage them from the clutch members 28. These clutch members or portions 28 of the clutch-pulleys 16 may be constructed in any suitable manner to interlock with the sliding clutches 18 and 19.

The clutch-shaft 17 is provided at its ends with sliding clutch-sections 33 and 34, which are adapted to interlock with clutch-sections 35 and 36 of shafts 37 and 38, disposed in alinement with the clutch-shaft and carrying the side drums 10 and 11. The sliding clutch-sections 34, which are connected with the clutch-shaft by keys or feathers, are operated by longitudinal levers 39 and 40, fulcrumed between their ends on suitable supports of the frame and extending to the rear thereof in order to be within easy reach of the engineer. By this construction either of the side drums may be thrown into operation when the central or main drum is cut out.

The central drive-belt has its lower flight engaged by a belt-tightener consisting of a lever-frame 40, of substantially-oblong shape, pivoted between its ends at 41 and having a pulley 42, mounted between the front ends of the sides and engaging the belt 24 at a point adjacent to the drive-wheel 25. The rear end of the frame is provided with a suitable weight 43, which may be varied to obtain the necessary power.

The side belts, which connect the clutch-pulleys with the front pulleys, are engaged by belt-tighteners 44, constructed similar to that before described, being provided at their front ends with loose pulleys or idlers and having suitable weights at their rear ends. The belt-tighteners 44, which are fulcrumed beneath the clutch-shaft, are located in the spaces between the longitudinal beams of the supporting-frame.

The side cables are attached to the main cable accordingly as the logs lie to one side of the apparatus or to the other, and this coupling may be effected by any suitable means, such as a hook 45 and an eye 46. In order to prevent the central and side drums from rotating too rapidly and paying out the cables too fast when they are free to rotate, band-brakes 47, 48, and 49 are provided, and each band-brake consists of a strap or band passing around the drum and having one end secured to the main frame, and its other end is connected with the operating mechanism hereinafter described. The band-brake 47 is connected by a rod 50 with a rock-shaft 51, which is controlled by a suitable handle or lever 52. The band-brake 48, which is arranged at one side of the apparatus, is connected by a rod 53 with one arm of a rock-shaft 54, and the latter is connected by a short rod 55 with an operating-lever 56. The rock-shaft 54, which is disposed transversely of the frame, extends from the space in which the drum 10 is mounted to the space between the adjacent longitudinal beams 12 and 13. The band-brake 49, which is located at the opposite side of the frame, is of the same construction as the band-brake 48 and is connected by a short longitudinal rod 57 with a transverse rock-shaft 58, provided at its inner and outer ends with arms, the inner arm being connected by a rod 59 with an operating-lever 60. The operating-levers of the band-brakes are arranged adjacent to one another and are within easy reach, as will be readily apparent.

It will be seen that the apparatus, which is simple and comparatively inexpensive in construction, possesses great strength and durability, that it is adapted to dispense with gearing for communicating motion from one shaft to another, and that the belt connections between the shafts produce a steady strain on the cable, so that the apparatus may be run at a right rate of speed without liability of injuring the cable. It will also be apparent that a reciprocatory carrier may be provided at either side of the apparatus and that the latter is readily controlled to cause the side cable to run out the central or main cable after a load of logs has been hauled in. Furthermore, it will be clear that the belts are maintained at the proper tension and that the drum, which is loose, is prevented from being rotated too rapidly, so that the cable being unwound will not slacken and become tangled.

Changes in the form, proportion, size, and the minor details of construction within the scope of the appended claims may be resorted to without departing from the spirit or sacrificing any of the advantages of this invention.

What is claimed is—

1. An apparatus of the class described comprising a central drum provided with a main cable extending horizontally from the frame, side drums located at opposite sides of the central drum and provided with supplemental or side cables wound around the side drums and extending horizontally from the frame, either of the supplemental or side cables being adapted to be connected with the main cable to form a reciprocatory conveyer at either side of the apparatus, means for driving the apparatus, and clutch mechanism for connecting the drums with and for disconnecting them from such mechanism, whereby the endless cable formed at either side of the apparatus may be driven in either direction, substantially as described.

2. An apparatus of the class described comprising a main drum provided with a main cable extending horizontally from the frame, side drums located at opposite sides of the main drum and provided with supplemental cables extending horizontally from the frame, either of the supplemental cables being adapted to be connected with the main cable to provide a reciprocatory carrier at either side of the apparatus, a clutch-shaft located in rear of the main drum and extending across the space between the side drums, belts, and pulleys connecting the clutch-shaft with the main drum, and clutches for connecting the side drums and the main drum with the clutch-shaft, whereby a reciprocatory carrier formed at either side of the apparatus, may be driven in either direction, substantially as described.

3. An apparatus of the class described comprising a supporting-frame, a central drum arranged at the front of the supporting-frame and provided with a main cable extending horizontally from the frame, side drums located in rear of the main drum at opposite sides of the frame and provided with supplemental cables extending horizontally from the frame and adapted to be connected with the main cable to provide a reciprocatory carrier at either side of the apparatus, a clutch-shaft located in rear of the main drum and arranged in alinement with the side drums, clutches for coupling the side drums to the clutch-shaft, the belt-and-pulley connections located at opposite sides of the main drum and connecting the same with the clutch-shaft, and means for coupling clutch connections to and uncoupling them from the clutch-shaft, substantially as described.

4. An apparatus of the class described comprising a supporting-frame, a central drum arranged at the front of the supporting-frame and provided with a main cable extending horizontally from the frame, the side drums located at opposite sides of the frame at points in rear of the central drum, and provided with supplemental cables extending horizontally from the frame and adapted to coöperate with the main cable to form a reciprocatory carrier at either side of the apparatus, front pulleys located at opposite sides of the central drum, a clutch-shaft located in rear of the main drum and disposed between the side drums, clutch-pulleys loose upon the clutch-shaft, a central pulley fixed to the clutch-shaft, a drive-belt arranged on the central pulley, side belts connecting the front pulleys with the clutch-pulleys, and clutches for connecting the drums and the clutch-pulleys with the clutch-shaft, substantially as described.

5. An apparatus of the class described comprising a supporting-frame, a central drum arranged at the front of the supporting-frame and provided with a main cable extending horizontally from the frame, side drums located at opposite sides of the frame in rear of the central drum and provided with supplemental cables extending horizontally from the frame and adapted to be connected with the main cable to form a reciprocatory carrier at either side of the apparatus, pulleys arranged at the ends of the central drum, a clutch-shaft located in rear of the central drum and arranged between the side drums, clutch-pulleys mounted on the clutch-shaft at opposite sides of the frame, side belts connecting the said pulleys, a central pulley fixed to the clutch-shaft, a centrally-arranged drive-pulley located in rear of the clutch-shaft, a central belt connecting the drive and central pulleys, and clutches for connecting the clutch-pulleys and the side drums to the clutch-shaft, substantially as described.

6. An apparatus of the class described comprising a supporting-frame, a central drum arranged at the front of the supporting-frame and provided with a main cable, side drums located in rear of the main drum at opposite sides of the frame and provided with supplemental cables, a clutch-shaft located in rear of the central drum and located between and in alinement with the side drums, front pulleys arranged at opposite sides of the central drum, clutch-pulleys located at opposite sides of the frame and mounted on the clutch-shaft, the side belts connecting the said pulleys, clutches mounted on the clutch-shaft for engaging the clutch-pulleys, the lever 29 fulcrumed between its ends and connected with one of the said clutches, the lever 30 fulcrumed at its rear end and connected with the other clutch, a rod connecting the levers, band-brakes engaging the drums, a transverse rock-shaft connected with the band-brakes of the side drums, and levers connected with the rock-shaft and with the band-brake of the central drum, substantially as described.

In testimony that we claim the foregoing as our own we have hereto affixed our signatures in the presence of two witnesses.

HARRY P. MASON.
THOMAS HART.

Witnesses:
JAS. BERRY,
B. J. DOWLING.